United States Patent [19]
Troutner et al.

[11] Patent Number: 5,421,951
[45] Date of Patent: Jun. 6, 1995

[54] PLATEN PRESS

[75] Inventors: Arthur L. Troutner; Kevin B. O'Sullivan; Dean G. Pritchard, all of Boise, Id.

[73] Assignee: Trus Joist MacMillan a Limited Partnership, Boise, Id.

[21] Appl. No.: 777,781

[22] Filed: Oct. 16, 1991

[51] Int. Cl.[6] .......................... B32B 35/00; B30B 5/00; B30B 15/00
[52] U.S. Cl. .................. 156/580; 156/583.1; 156/583.5; 100/93 P; 100/138; 100/151; 100/219; 100/236; 100/238; 100/258 R; 100/258 A; 100/264; 100/295; 100/296
[58] Field of Search ...................... 156/580, 581, 583.1, 156/583.3, 583.5, 583.8, 583.9, 583.91; 100/219, 264, 295, 296, 151, 93 P, 93 RP, 138, 143, 178, 258 R, 258 A, 204, 163 A, 187, 236, 238, 262, 276

[56] References Cited

U.S. PATENT DOCUMENTS

| | | | |
|---|---|---|---|
| 1,016,258 | 2/1912 | Francis | 100/295 X |
| 1,563,684 | 12/1925 | Black | 100/295 X |
| 2,122,376 | 6/1938 | Mason | 100/93 RP |
| 2,997,083 | 8/1961 | Pfefer | 100/93 P |
| 3,676,265 | 9/1972 | Edwards | 100/151 X |
| 3,723,230 | 3/1973 | Troutner | 156/580 |
| 3,993,426 | 11/1976 | Ahrweiler et al. | |
| 3,998,580 | 12/1976 | Pfiffer | 100/93 P X |
| 4,408,520 | 10/1983 | Wons et al. | 100/93 P |
| 4,450,034 | 5/1989 | Stern | 156/583.3 X |
| 4,827,630 | 5/1989 | Honda et al. | 34/146 |
| 4,923,384 | 5/1990 | Gerhardt | 156/583.5 X |
| 5,096,409 | 3/1992 | Stofko | 100/73 X |

FOREIGN PATENT DOCUMENTS 2254708 5/1973 Germany .................... 100/151

*Primary Examiner*—David A. Simmons
*Assistant Examiner*—M. Curtis Mayes
*Attorney, Agent, or Firm*—Hartwell, Dickinson, McCormack & Heuser Kolisch

[57] ABSTRACT

A continuous press for pressing glued press charges is provided. The press includes first and second generally parallel press platens, a driver for driving the press platens through a working stretch at a predetermined rate of travel, and a system for maintaining a predetermined spacing between the press platens to compress and unify the press charges disposed between the first and second press platens. The system is designed to travel through the working stretch of the press, with the press platens, at the predetermined rate of travel.

6 Claims, 10 Drawing Sheets

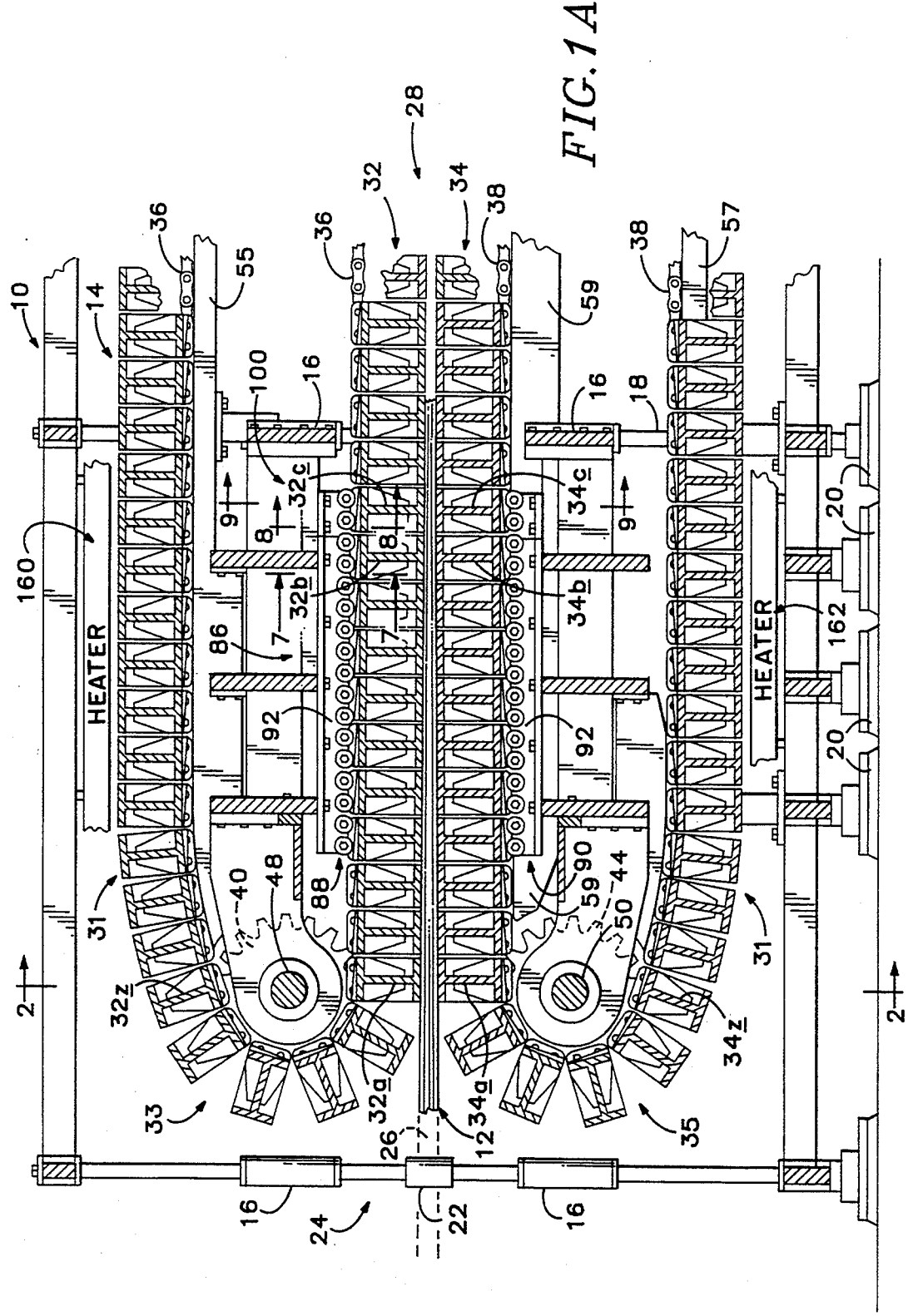

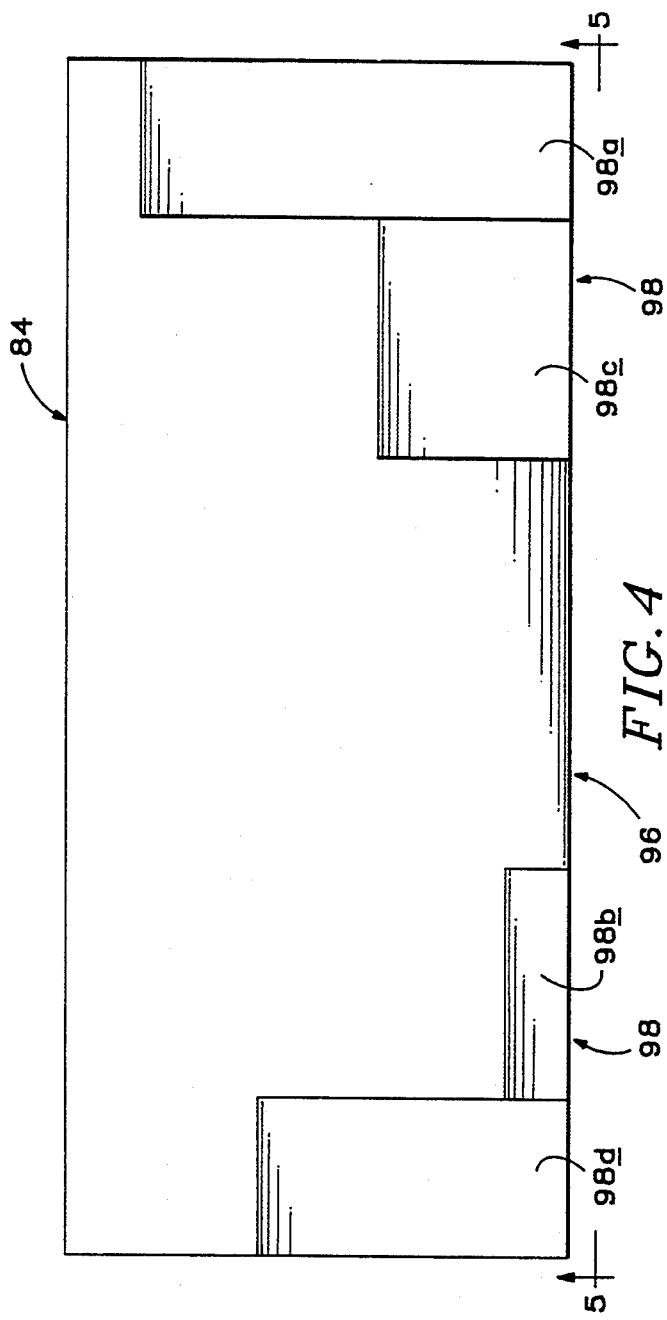

PLATEN PRESS

BACKGROUND OF THE INVENTION

This invention relates to a platen press for pressing glued press charges, and more particularly, to a platen press which includes a system for maintaining a predetermined spacing between the press platens to thereby control compression of the press charges as the charges are conveyed through a working stretch of the press.

Conventional platen presses, such as the press disclosed in U.S. Pat. No. 3,910,179 to Trouther, include a pair of elongated, vertically spaced press beds, a pair of endless press belts positioned between the press beds, and a pair of endless anti-friction roller belts disposed between the press beds and the press belts. Stationary roller assemblies are positioned at critical locations along the length of the press to control the alignment of the press charge. Lateral edge guides are provided in known presses to guide the press belts and the press charges as they move through the press. Drive means are connected to the press belts for advancing the belts in the feed direction through a working stretch at a rate predetermined to produce optimal consolidation of the press charge during setting of the glue.

In the type of platen press described above, the press beds, press belts, and anti-friction rollers are massive steel members with high pressures developed at interfaces between these components. Because of these pressures, expensive and intricate bearing systems with hardened steels must be utilized to resist the high contact stresses. Heat transfer to the platens is difficult during press operation because of the limited linear contact between the rollers and platens. Also, it is necessary to use grease as a lubricant to reduce the friction between the rollers, press belts and bedplates. A problem with using grease is that it leaves grease marks, commonly called "tiger stripes," which mar the finished press charge. Grease streaking is deleterious both from a cosmetic standpoint and from a subsequent usage standpoint because the grease affects the subsequent gluability of the surface. Such gluability is critical in the operation of a billet press.

Another drawback with conventional systems is that high contact stresses between the rollers and the platens can result in "football" shaping of billets due to concave platen bowing.

Accordingly, a general object of the present invention is to provide an improved platen press which overcomes the drawbacks and limitations of the prior art proposals. More specifically, the invention has as its objects the following:

(1) to provide a lighter weight press assembly and to reduce the pressure induced friction between press components;

(2) to develop a platen press which eliminates the need to use grease as a lubricant to reduce friction between the components;

(3) to develop a system in which uniform pressure is maintained as the press charge passes through the working stretch;

(4) to provide a platen press which does not require application of heat as the press charge is being conveyed through the press;

(5) to provide a platen press having lower maintenance requirements and a significantly longer press life;

(6) to develop a press which is less expensive and less time consuming to construct;

(7) to develop a platen press which gradually and uniformly applies increasing pressure to a press charge as the charge enters the press; and (8) the provision of a system for fabricating billets with greater dimensional uniformity than is possible with existing platen presses.

SUMMARY OF THE INVENTION

One way in which these and other objects may be attained is by providing a continuous press for pressing glued press charges, which includes first and second sets of press platens, and a conveyor system for driving the press platens through a working stretch at a predetermined rate of travel. Each set of press platens travels in a predetermined plane, the two planes being generally parallel and spaced apart. A spacing system for maintaining a predetermined spacing between the sets of platens is also provided, with at least part of the spacing system traveling with the platens through the working stretch. The first and second press platens are normally in an upper and lower position, above and below a laterally extending press charge, and therefore will be referred to sometimes as upper and lower press platens.

Another aspect of the invention is a compression system to be used in such a press, for densifying the press charges in an infeed section of the press. The compression system includes rollers, which do not travel with the press charges through the working stretch, and inclined platen tracks, which do travel therewith. The rollers are aligned in either a tapered compression path, or in a clamping path, through a compression portion, or infeed compression zone, of the press. Each of these paths is defined in the platen track surfaces to be operable during a compression stage in which the press charges are being densified, or in a roll-off stage as the press platens leave the rollers at the end of the infeed compression zone.

Yet another aspect of the invention is a method of pressing glued press charges in a continuous press having a pair of power-driven cooperating press belt means for mounting a plurality of press platens, wherein the pair of press belt means has a working stretch in which at least some of the platens on one belt means are disposed above the press charge, generally opposite at least some of the platens on the other belt means. The method comprises fixedly clamping together opposing platens with the press charge disposed therebetween to apply continuous compression to the press charge as it travels through working stretch of the press.

These and other objects, features and advantages of the invention will become apparent as the description is read in conjunction with the drawings.

BRIEF DESCRIPTION OF THE DRAWINGS

FIG. 1A is a fragmentary side elevation view of the infeed portion of the press of the invention, with a clamp assembly and heater mechanism removed for convenience of illustration.

FIG. 4 is a top plan view of an inclined platen track.

FIG. 5 is a front elevation of the inclined platen track, taken along the line 5—5 of FIG. 4.

DETAILED DESCRIPTION OF A PREFERRED EMBODIMENT

Figure 1B:
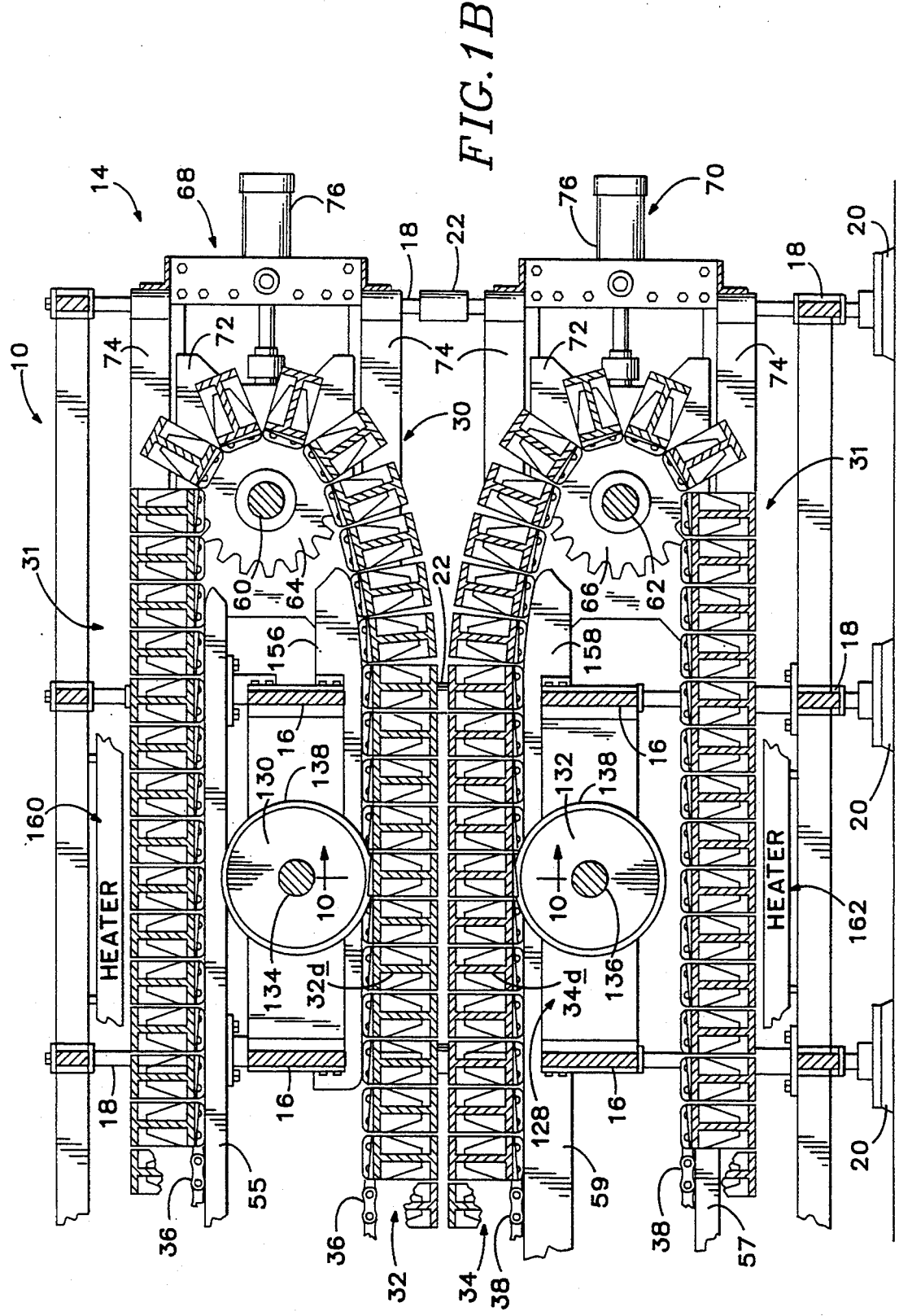
FIG. 1B is a fragmentary side elevation view of the outfeed portion of the press of the embodiment of FIG. 1A.
Figure 2:
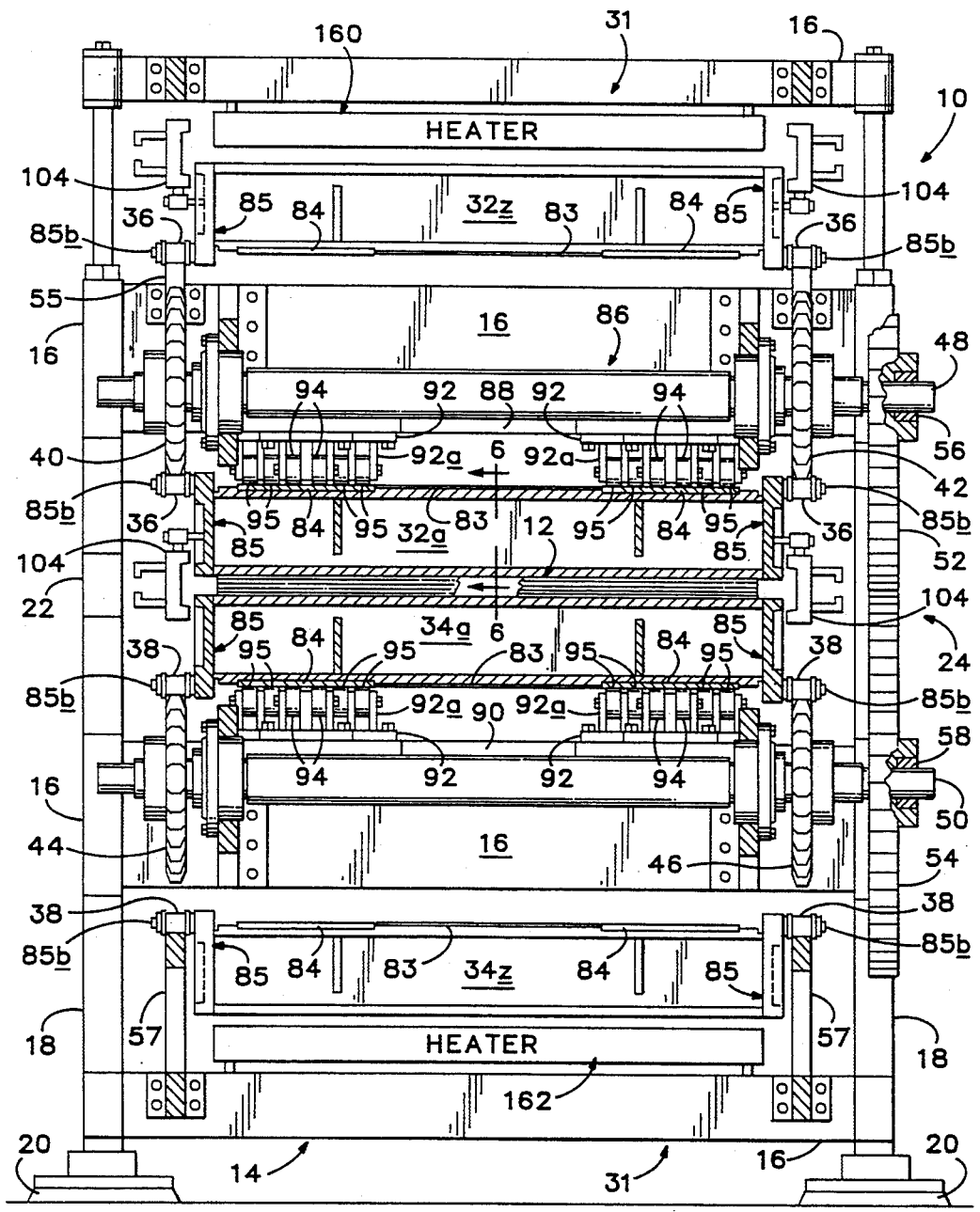
FIG. 2 is an end elevation view of the infeed portion of the invention, taken along line 2—2 of FIG. 1A.

Turning now to the drawings and initially to FIGS. 1A, 1B and 2, a continuous press for pressing laterally extending glued press charges is depicted generally at 10. Press 10 is used to consolidate, or press, a workpiece or press charge, such as that depicted at 12 which comprises glued sheets of veneer which are pressed together to form laminated veneer lumber (LVL). The completed LVL, also referred to herein as a billet, may be then cut again and re-laminated to form LVL beams, joists, etc. This type of press, however, may be used in the manufacture of a variety of gluable press materials.

Press 10 is mounted on a frame assembly 14, which includes a plurality of horizontal support members, such as 16 which are in turn supported by a plurality of horizontally spaced vertical support members 18. Vertical support members 18 are secured to foundation members 20 and include turn buckles 22 which may be used to align and adjust the height of frame assembly 14 to produce a billet of a desired thickness.

Press 10 has an infeed end, shown generally at 24, which includes an infeed conveyer 26, which brings a veneer workpiece from a lay down and gluing assembly point to press 10, a working stretch, shown generally at 28, and an outfeed portion, shown generally at 30. Outfeed portion 30 may include an outfeed conveyer, to transport the condensed LVL billet to the next work station. A return portion 31 extends between the outfeed portion and the infeed portion in a non-working area of the press.

Press 10 includes an upper, or first set of, press platens, shown generally at 32, having upper press platens 32a, 32b, etc. therein, and a lower, or second set of press platens, shown generally at 34 having lower press platens 34a, 34b, etc. therein. A conveyor system is provided for conveying the upper or first set of press platens 32 through the press in a predetermined plane. This conveyor system includes a first endless support member 36, which in the preferred embodiment takes the form of an endless link roller chain. The lower, or second, set of press platens 34 also has a conveyor system, which includes a second endless support member 38, which conveys the second or lower set of press platens along a second plane, generally parallel to, but spaced from, the plane of travel of the first, or upper set, of press platens. Platens 32 and support member 36 thus comprise what is referred to herein as an upper power-driven press platen conveyer, or belt, 33, while press platens 34 and endless support 38 comprise a lower power-driven press platen conveyer, or belt, 35. The support members transversely mount a plurality of pairs of opposed upper and lower press platens such that a press platen of each pair is located one above and one below press charge 12 as the press charge enters infeed end, or portion, 24 and traverses working stretch 28. The support members extend longitudinally along press 10.

Chains 36 and 38 are supported at infeed portion 24 by sprockets 40, 42, and sprockets 44, 46, respectively. The upper sprockets are carried on an upper infeed shaft 48, while the lower sprockets are carried on a lower infeed shaft 50. An upper timing gear 52 and lower timing gear 54 are also carried on shafts 48, 50 respectively, and are connected to the shafts by radial adjustment collars 56, 58, which allow initial timing of the upper and lower shafts and hence the upper and lower belt means. Chains 36, 38 are supported through a return stretch of press 10 on chain guides 55, 57, respectively. Lower chain 38 is supported on a chain guide 59 through infeed portion 24 and working stretch 28.

Referring to FIG. 1B, the outfeed portion 30 includes upper outfeed shaft 60 and lower outfeed shaft 62, carrying upper sprockets 64 and lower sprockets 66, respectively. A means for driving the press platen set on press 10 includes a motor and reduction gear assembly connected at the outfeed end of the upper and lower outfeed shafts. Suitable clutch arrangements are provided to allow the upper and lower support chains to move in synchronization with their associated press platens. Such details are believed to be well known to those of ordinary skill in the art and are not depicted in the drawings for the sake of clarity.

The conveyor system includes an upper tensioning assembly 68 and a lower tensioning assembly 70. Tensioning assembly 68 and 70 maintain drive chains 36, 38 under continuous tension. The tensioning assemblies each include a carriage 72 which is mounted on rails 74 and which are longitudinally adjustable by cylinders 76 to facilitate variation of chain tension. The motor/gear assembly and drive chains 36, 38 comprise what is referred to herein as means for mounting and driving the press platens.

Figure 6:
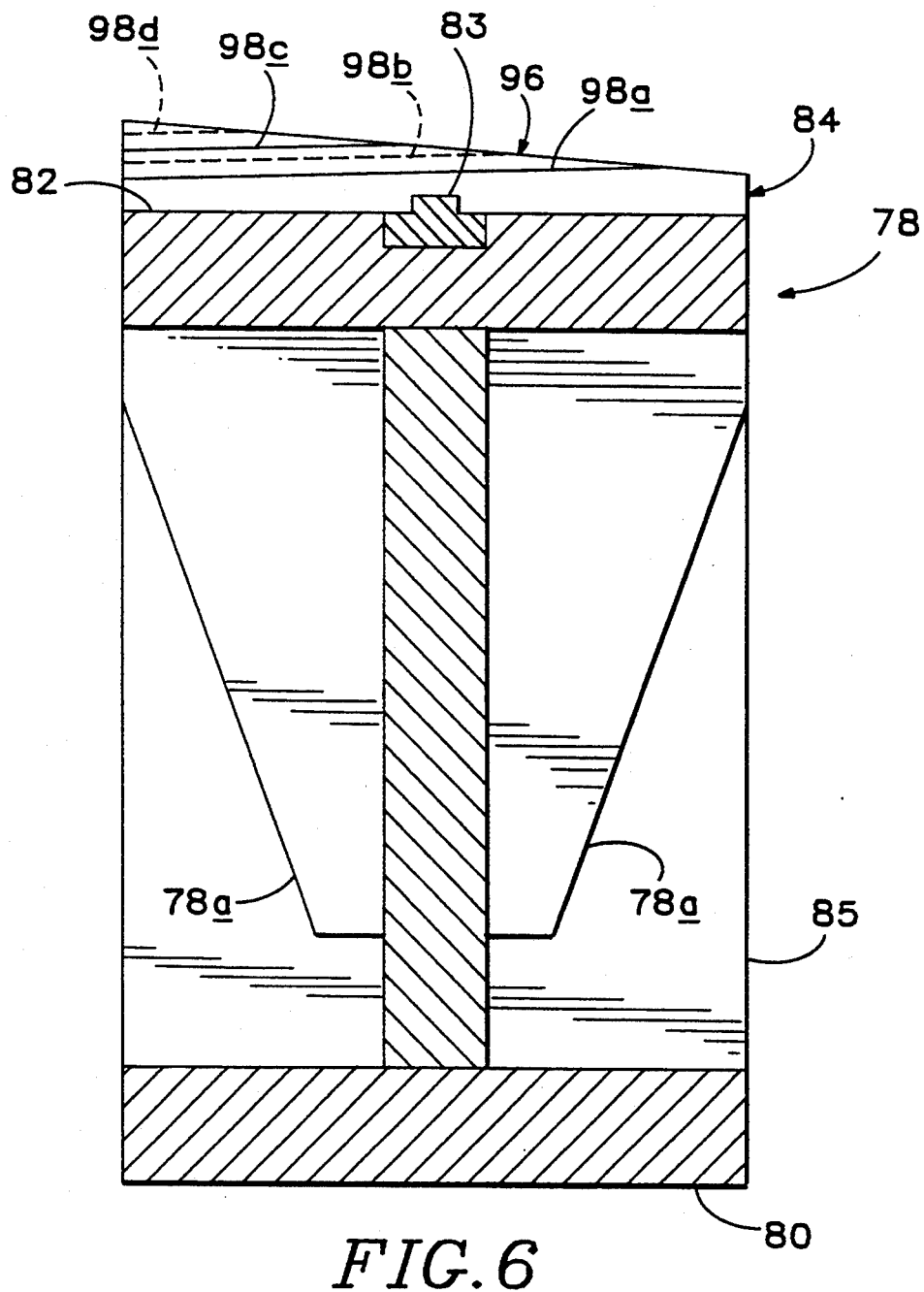
FIG. 6 is a side sectional elevation of a platen of the invention, taken along the line 6—6 of FIG. 2.

Turning momentarily to FIGS. 2 and 6, a single press platen 78 is shown in enlarged cross section. The press platen is generally elongate, and has a rectangular, I-shaped cross section. An inner surface 80 is provided and contacts the press charge. An outer surface 82 includes a platen key 83, which extends between a pair of spaced apart inclined platen cams 84 thereon. Gussets 78a are provided to stiffen platen 78. In the preferred embodiment, the width of platen 78, i.e., that dimension which parallels the longitudinal axis of press 10, is narrower than the height. This provides desirable heat transfer/heat sink properties. Platen 78 includes an end plate 85 at each end thereof, which provides clamp-receiving means 85a, and chain attachment means 85b for attaching platen 78 to drive chains 36 or 38. Platens are arranged in platen pairs which includes one platen from upper platen set 32 and one platen from lower platen set 34.

Referring again to FIGS. 1A and 1B, infeed portion 24 includes what is referred to herein as a first compression system depicted generally at 86. The compression system 86 provides for gradual densification of a press charge 12 as the press charge moves along the length of infeed portion 24. The first compression system 86 uniformly moves press platens in first set 32 vertically towards an associated press platen in second set 34, thereby biasing the upper and lower press platens towards one another along the length of infeed portion 24.

The first compression system 86 includes a pair of roller units, one of which, 88, is associated with upper belt means 33 and the other of which, 90, is associated with lower belt means 35. Roller units 88 and 90 are identically constructed, with the only difference therebetween being that lower roller unit 90 is inverted relative to upper roller unit 88.

Figure 3:
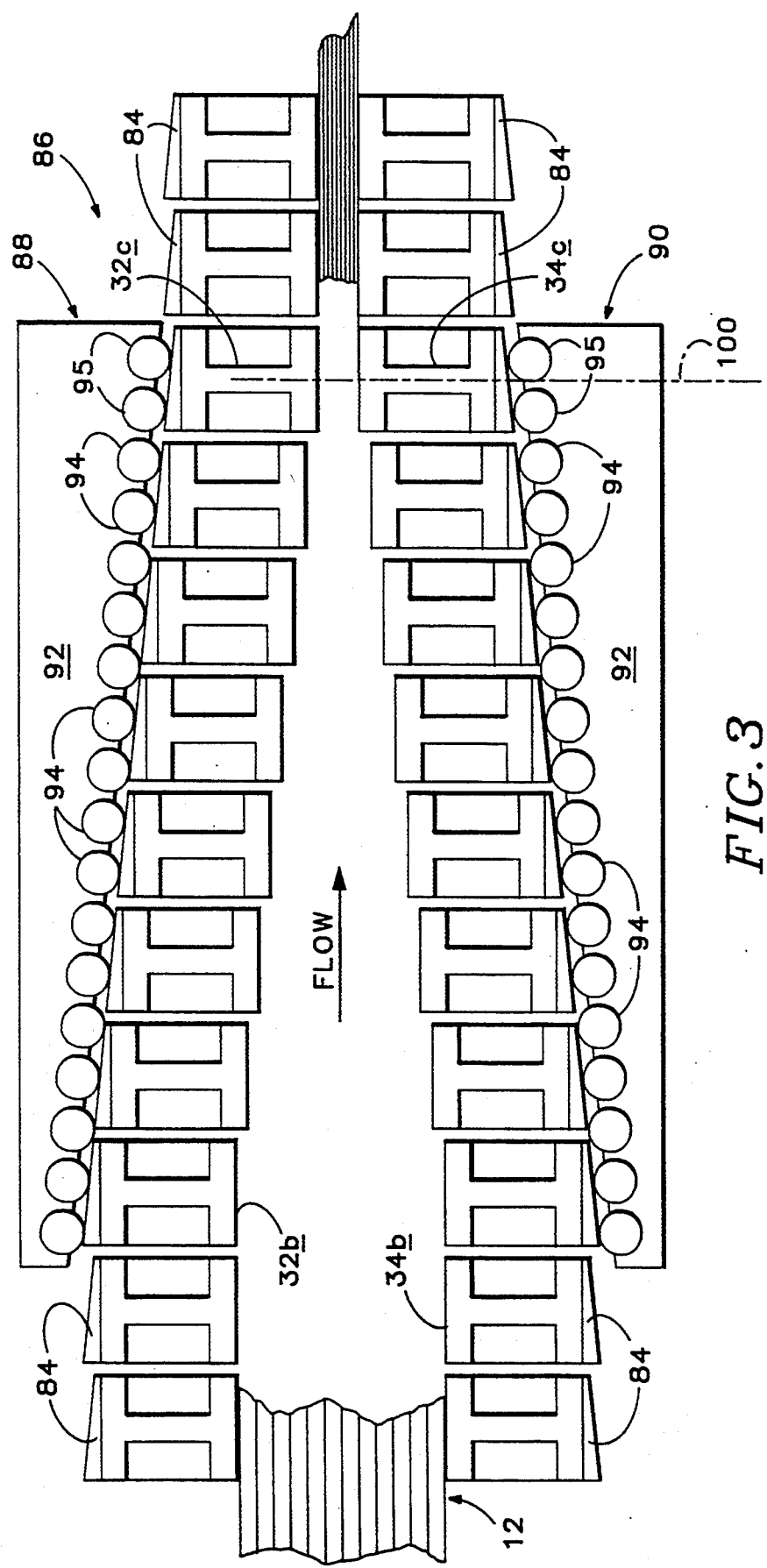
FIG. 3 is a greatly enlarged side elevation of a compression roll mechanism of FIG. 1A.
Figure 7:
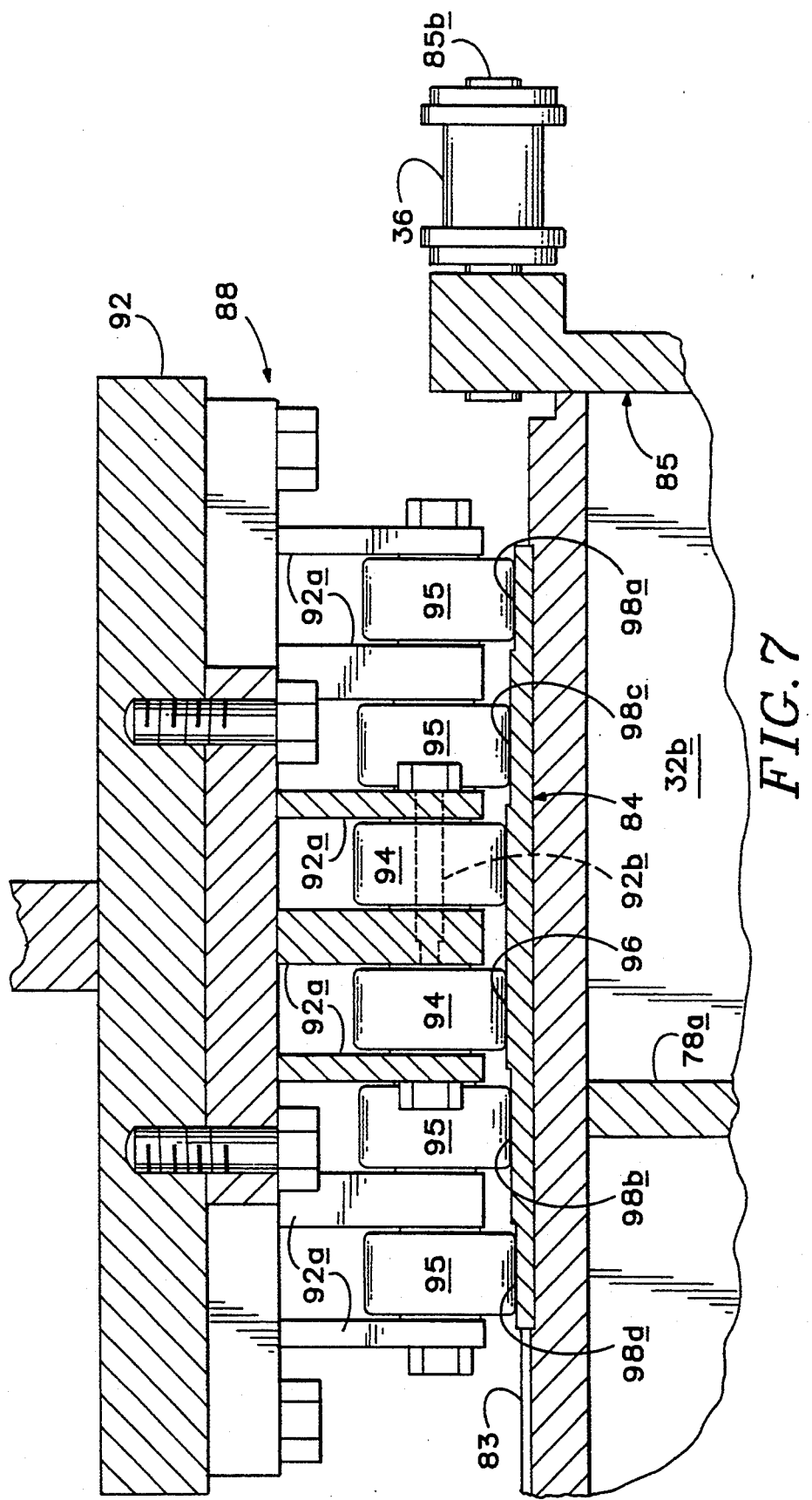
FIG. 7 is an end elevation of a first, top pressure roll set, taken along line 7—7 of FIG. 1A.
Figure 8:
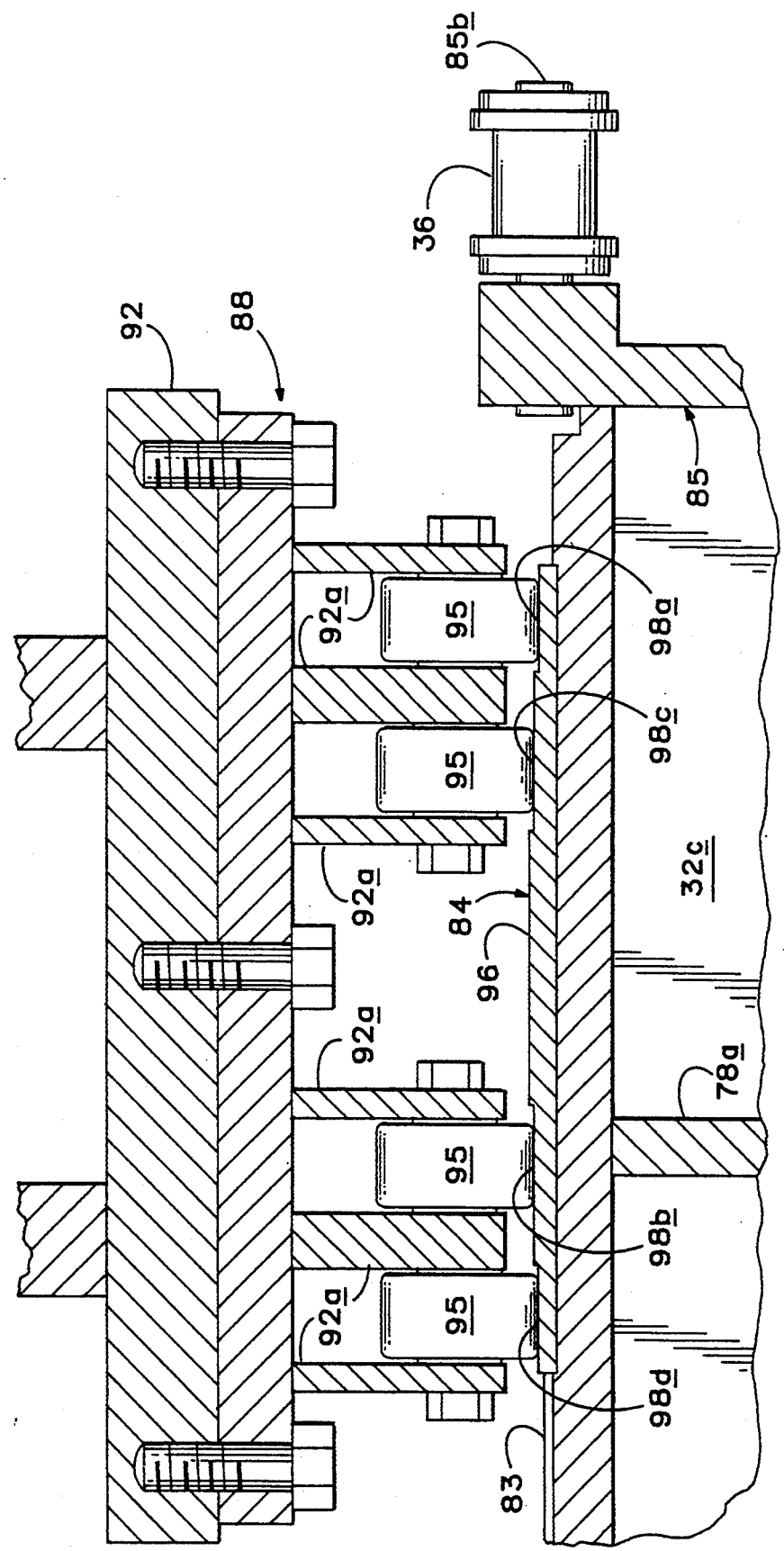
FIG. 8 is an end elevation of a second, top pressure roll set, taken along line 8—8 of FIG. 1A.

Turning now to FIGS. 3, 7 and 8, a greatly exaggerated representation of the compression system 86 is depicted. With reference to upper roller unit 88, a tapered frame 92 is provided which carries plural rollers, such as those depicted at 94, on roller brackets 92a and roller shafts 92b, such that the rollers form an inclined plane. First set of rollers 94 define a compression path on frame 92. A second set of rollers, represented by 95, is located adjacent a clamping station, which will be described in greater detail later herein, and which compresses charge 12 to a predetermined thickness between an opposed pair of platens during a clamping operation.

It may be seen that opposed platen pair 32b, 34b, (FIGS. 1A and 3) initially contact the rollers in first roller set 94 and are initially pressed together, thereby compressing press charge 12. Rollers 94 operate on inclined platen tracks 84. Referring momentarily to FIGS. 2, 4 and 5, details of inclined platen track 84 are more clearly shown. As previously noted, inclined platen tracks 84 are carried on outer surface 82 of each press platen with, in the preferred embodiment, one inclined platen track located adjacent either end of a press platen. The central portion of the inclined platen track, in the preferred embodiment, defines a compression portion, depicted generally at 96, and which occupies the center portion of the platen track. The remainder of platen track 84 comprises what is referred to herein as a roll-off portion 98, and includes sub-portions 98a, 98b, 98c and 98d. Roll-off portion 98 is constructed to cooperate with the second roller set 95 to hold opposed press platens in a desired spaced apart relationship while a clamping operation takes place.

The arrangement of the first and second set of rollers may be seen by reference to FIGS. 2, 7 and 8. As depicted in FIG. 2, the first roller set is arranged in roller pairs, which traverse the central or compression portion of the inclined platen track. A second set of rollers are also formed in pairs, such that four rollers are always in contact with any portion of the inclined platen track roll-off portion. First compression means 86 is located upstream and adjacent to a clamping station 100, and facilitates engagement of the clamp means.

Figure 9:
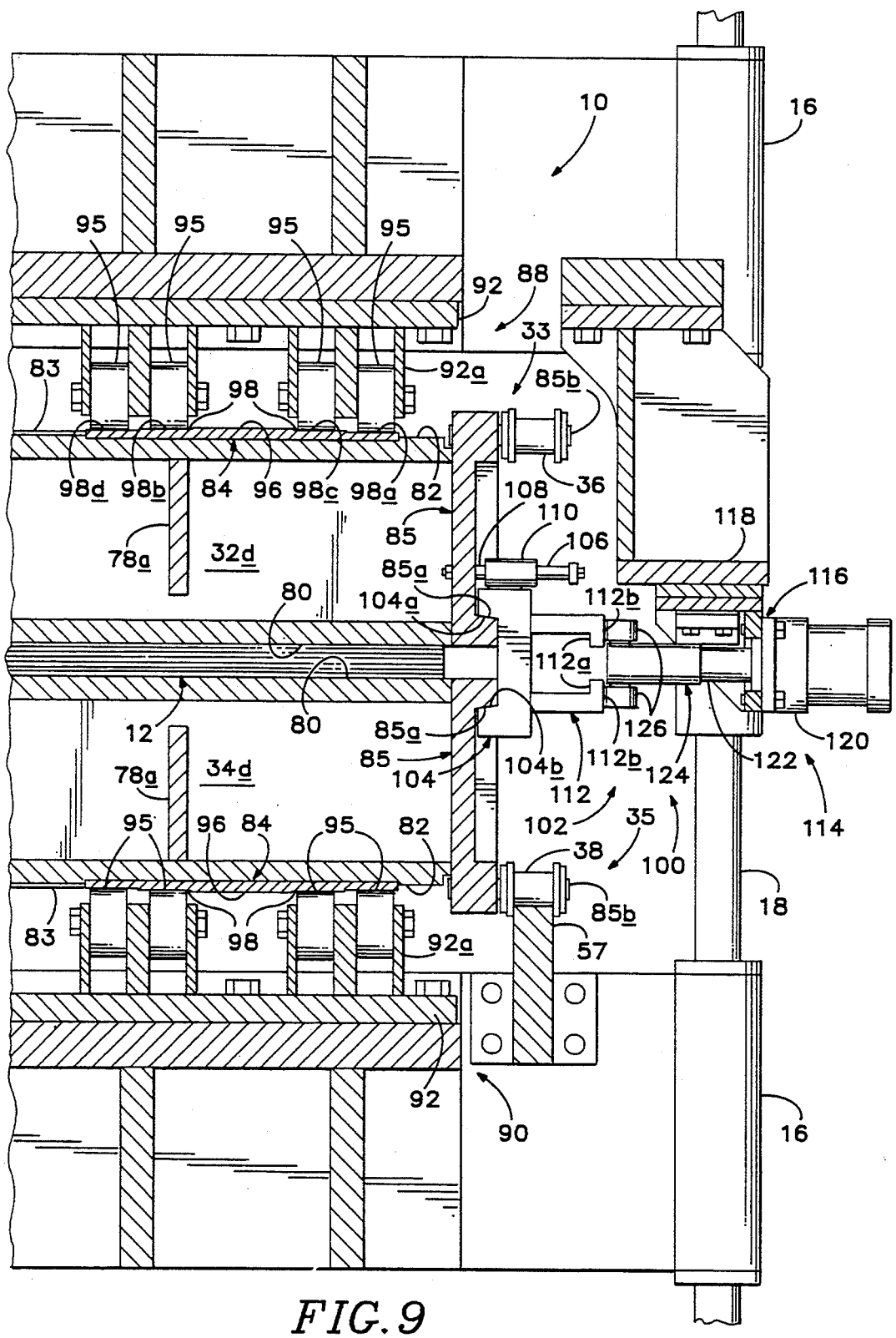
FIG. 9 is an fragmentary enlarged end sectional elevation of the compression mechanism depicting a clamp engaging mechanism, taken along line 9—9 of FIG. 1A.

The arrangement of roll-off portion 98, and sub-portions a, b, c and d, provide for a leveling of platens 32c, 34c at clamping station 100. Referring now to FIGS. 1A and 9, clamping station 100 will be described in greater detail. Press 10 includes what is sometimes referred to herein as fixing means, which are depicted generally at 102. Fixing means travel with the press platens and fix the relative position of opposed pairs of platens, such as 32c, 34c, such that a predetermined amount of pressure is applied to press charge 12 as the press charge passes through working stretch 28. Fixing means includes a spacing system which maintains a predetermined spacing between the press platens through the working stretch. As depicted in FIG. 9, opposed press platens 32c, 34c are held in a working relationship relative to one another by a clamp member 104. Clamp member 104, in the preferred embodiment, has a substantially C-shaped form and cooperates with end plates 85 of press platens 32c, 34c to selectively engage a platen in the first set of press platens to a press platen in the second set of press platens to exert pressure on press charge 12 through working stretch 28. End plates 85 define lateral edges of the press platens, and include a clamp engaging surface 85a, which is engaged by a pair of spaced apart platen engaging surfaces 104a, 104b.

In the preferred embodiment, two clamp members, or clamp means, are carried on each platen in upper press platen set 32 by means of shafts 106 which are secured through end plate 85 at each end of the press platen, one adjacent the leading edge of the platen and one adjacent the trailing edge. Each shaft 106 has a keyway 108 thereon, which cooperates with a conformal key in a clamp mount 110, which is received on shaft 106 such that clamp 104 is allowed to shift relative to the platens in first press platen set 32 with only lateral movement relative to the press platens. Shaft 106, keyway 108 and clamp mount 110 provide what is referred to herein as means for mounting clamp 104 to a press platen. Clamps 104 also include a channel element 112 which includes spaced apart inner channel surfaces 112a and spaced apart outer channel surface 112b, which cooperate with a mechanism for selectively engaging clamps 104 to shift the clamps between an engaged and a disengaged position.

As shown in FIG. 9, an apparatus for engaging clamp means is depicted generally at 114, and comprises part of the mechanism for selectively engaging the clamp assembly. The apparatus 114 for selectively engaging the clamp assembly includes a hydraulically operated interlocking means, which includes a stationary engagement apparatus 116, carried on a bracket 118, which is secured to vertical support member 18. A pneumatically operated system may also be used. As used herein, "hydraulic" is meant to encompass any mechanical or fluid system which is operable to accomplish the desired operation. Bracket 118 carries a hydraulic cylinder 120 thereon, which has an arm 122 extending therefrom. An insertion device 124 is carried on rod 122 and, in turn, has rollers 126 journalled thereon. Rollers 126 cooperate with outer channel surface 112b of clamp 104 and exert an insertion force thereon, thereby pushing clamp member 104 into engagement with a pair of opposed press platens 32c, 34c. A similar stationary engagement apparatus is located on the opposite side of press 10 for engaging clamp members at the other end of the press platens. Although, in the preferred embodiment described herein, the upper and lower platens move as an opposed pair, the press may be constructed so that a staggered arrangement of press platens is provided.

Once the clamps are engaged, the platens, workpiece and clamps transit working stretch 28 where the workpiece is subjected to a predetermined amount of pressure by the opposed, clamped platens, and where heat is transferred to the workpiece from the platens. A clamp assembly, i.e., the clamp member and channel, is selectively engageable with the lateral edges of at least one opposed pair of press platens to for a mechanical interlock between the upper and lower platens.

Figure 10:
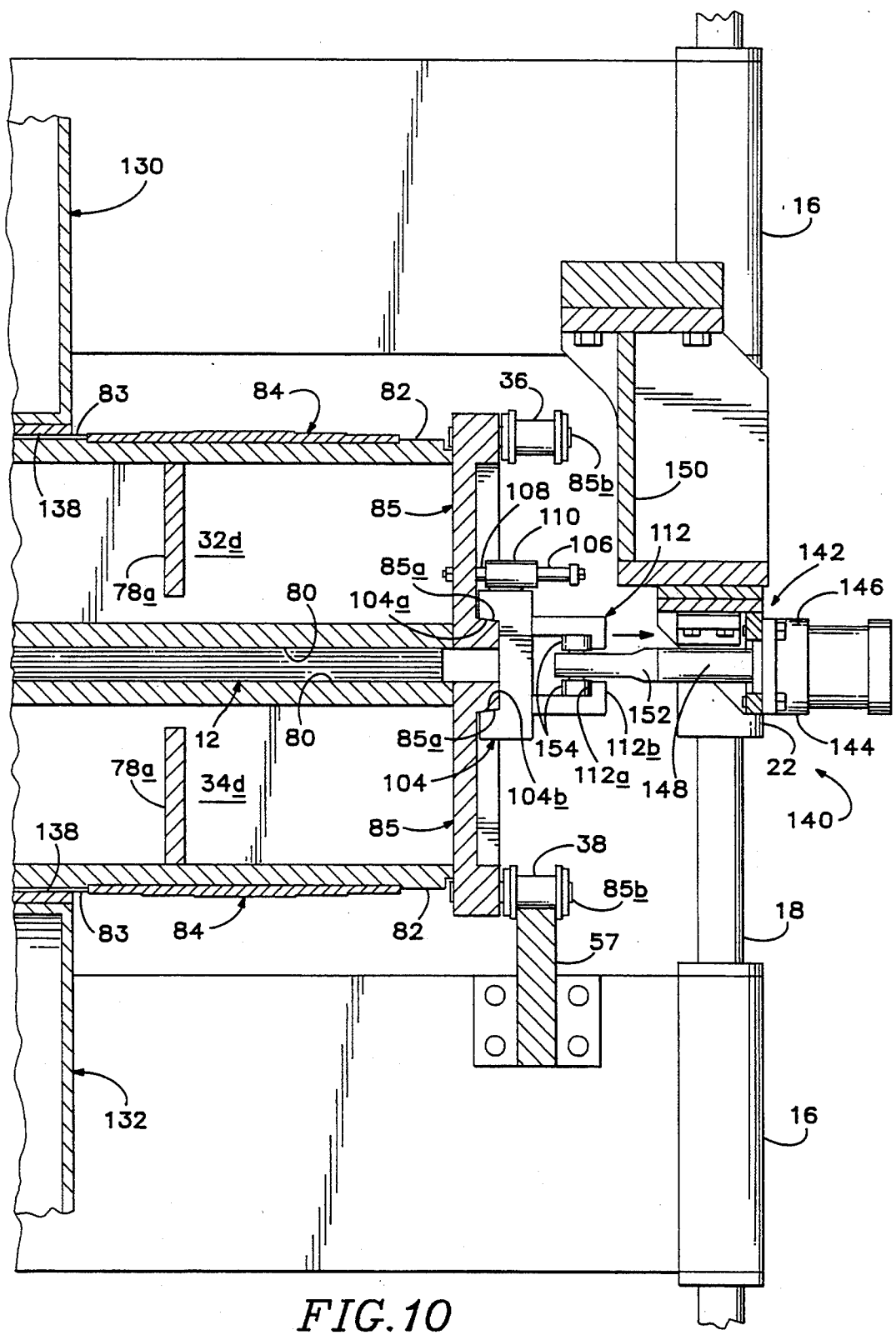
FIG. 10 is a fragmentary end sectional elevation of the mechanism depicting a clamp disengaging mechanism, taken along line 10—10 of FIG. 1B.

Referring now to FIG. 1B and 10, outfeed portion 30 includes a second compression system, depicted generally at 128, which is operable to bias the upper and lower press platens to facilitate disengagement once the workpiece and platens have traveled beyond the working stretch. In the preferred embodiment, the second compression system includes a pair of pressure drums 130, 132, which are disposed one above the other, and extend transversely of the press, one above, and one below press charge 12. The drums are journalled on shafts 134, 136, which are supported on frame assembly 14. A hard steel cover 138 is provided on the drums which roll over platen keys 83 as the platen keys contact the drums.

Drums 130, 132 are located adjacent an apparatus for disengaging the clamping means, shown generally at 140 in FIG. 10. The disengaging apparatus 140 forms the other part of the mechanism for selectively engaging the clamp means. The disengaging apparatus includes a stationary disengagement apparatus 142, which has a piston assembly 144, having a cylinder 146 and a piston rod 148. Piston assembly 144 is carried on a bracket 150 which is fixed to vertical support member 18. A similar stationary disengagement apparatus is located on the opposite side of press 10.

An extraction device 152 is mounted on piston rod 148 and includes a pair of rollers 154 which are operable to exert a withdrawal force on inner channel surface 112a of channel 112 carried on clamp member 104. Retraction of piston rod 148 is operable to move clamp member 104 laterally on shaft 106, thereby disengaging clamp member 104 from opposed platens 32d, 34d. Drums 130, 132 are spaced such that a slight compressive force is applied to platens 32d, 34d to facilitate removal of clamp member 104 from the lateral edges of press platens 32d, 34d.

The second compression system and the stationary disengagement apparatus defines the beginning of outfeed portion 30 of press 10. Once the opposed press platens in the upper and lower belt means are in the outfeed portion, they begin a divergent path, with chains 36 and 38 following a path along guides 156, 158, respectively, which guides the upper and lower belts, respectively, to the outfeed sprocket 64, 66, respectively. Press charge 12 has now been compressed and heated as it has moved through the working stretch and is transported away from press 10 by means of an outfeed conveyer (not shown).

Heating means, shown generally at 160, 162 are provided to heat press platens in press platen sets 32, 34. Heating means, in the preferred embodiment, include radiant heat sources for applying heat to inner surface 80 of the press platens prior to contact of the inner surfaces with the press charge. The upper and lower heat sources are fixed to frame assembly 14 by means of brackets which are connected to the support members of the frame assembly.

Heat is applied to the inner surface of the press platens along the return stretch 31 of the press, with sufficient heat being applied to induce an outward camber of the inner press platen surface towards the heat source. By directly heating platen inner surfaces 80, the surface expands, causing a slight outward bowing, or cambering, of the platen towards the heat source, in both the platen's transverse and longitudinal directions. This feature, referred to herein as thermal cambering, is advantageous because it counteracts the normal bowing of the platens which often takes place with conventional press designs during the pressing operation. The I-beam configuration of the press platens also serves to provide sufficient strength to further minimize undesirable bowing. Such bowing is an undesirable feature of normal presses because it causes the press charge to be somewhat "football" shaped in cross-section. The induced thermal camber must be sufficient to insure that, at a minimum, there will be no outward bowing, which would result in a platen having a concave surface relative to the workpiece, along the working stretch of the press.

By positioning heat sources 160, 162 directly adjacent platen inner surfaces 80, a superior method of heating the platens is achieved. In conventional LVL presses, platens are heated indirectly, usually through the antifriction rollers, which are not present in the press of the invention, which are disposed between the heater units and the press belts. These rollers and other structural components are conventionally massive because of the pressure which must be provided to maintain the press charge at a desired thickness during the pressing operation. Thus, the entire structure must be permeated with heat to reach the press charge itself. The present invention largely eliminates this structure by providing a single clamp system which travels with each of the platen pairs. Additionally, the configuration of the platens, wherein the height dimension is far greater than the widths, provides a substantial heat sink which does not need additional heat to be applied during a pressing operation.

OPERATION

In operation, press charge 12 is fed into infeed portion 24 by infeed conveyer 26. The press charge is contacted by the heated inner surfaces 80 of the press platens. As the press charge passes through the infeed portion of the press, the rollers of the first compression system 86 exert pressure on opposed platen pairs, such as 32a, 34a, and provide gradual densification of the press charge along the length of the infeed portion. As the press charge and the platens which are compressing the press charge reach clamping station 100, the LVL billet is reduced to a thickness very close to that of its final, finished dimension. At this point, clamps 104 are applied to the lateral edges of the platens by stationary engagement apparatus 116.

The press charge, the press platens and the fixing means then pass through the working stretch, wherein a predetermined amount of pressure is applied to the press charge by the fixing means and platens. Heat is also transferred from the press platens into the press charge to form and set the LVL structure. Thus, means are provided for driving the press platens through the working stretch in a generally parallel, spaced apart relationship, at a predetermined rate of travel, which also drives the clamps, or spacing system.

As the press charge approaches the outfeed portion, drums 134, 136 provide a slight additional compression on the opposed platens, thereby facilitating withdrawal of the clamps from the lateral edges of the platens. Once the clamps are removed, the platens diverge, thereby freeing the LVL press charge which exits the press.

In the preferred embodiment, clamp members 104 are attached to each press platen in the upper press platen set 32. As the press platens move over the return stretch towards the infeed portion of the press, the clamp members move with the individual press platens in the upper set. A clamp positioner (not shown) may be provided to assure that the clamp members are fully in their withdrawn position prior to reaching infeed portion 24, to prevent improper alignment of the clamp members with the press platens in the second, lower press platen set.

The press as disclosed is suitable for forming a LVL billet of a given thickness, such as one and a half inches. However, if it is desired to form a LVL billet having a different thickness, the upper and lower platen sets may be adjusted relative to one another by adjusting turn buckles 22 to provide the different spacing, and replacing clamp members 104 with damps having a different dimension between clamp faces 104a, 104b.

Although a preferred embodiment of the invention has been disclosed herein, it should be appreciated that further modifications may be made thereto with out departing from the scope of the invention as defined in the appended claims.

We claim:

1. In a continuous press for pressing glued press charge workpieces, the combination of:

a first set of press platens;

a second set of press platens;

a conveyor system for driving said sets of press platens through a working stretch of the press at a predetermined rate of travel with each set of press platens traveling in a predetermined plane, the two planes being generally parallel and spaced apart; and a spacing system for maintaining a predetermined spacing between said sets of press platens through said working stretch, at least a portion of said spacing system traveling with said platens through said working stretch;

further comprising an infeed portion having a compression system for densifying the press charges in said infeed portion, the compression system including a roller unit having plural rollers and inclined platen tracks arranged to form an inclined plane associated with each press platen, to move a press platen in said first set toward an associated press platen in said second set;

wherein said roller unit includes a first set of rollers arranged in a compression path, and a second set of rollers arranged in a clamping path, and wherein said inclined platen tracks each includes a compression portion aligned with said first set of rollers in said compression path, and a roll-off portion aligned with said second set of rollers in said clamping path.

2. A continuous press for pressing laterally extending glued press charges, comprising:

a plurality of pairs of upper and lower press platens;

an upper power-driven platen conveyor, disposed above the press charges, for mounting and driving said upper platens through a working stretch of the press;

a spacing system for maintaining a predetermined spacing between said upper and lower platens through said working stretch; and an infeed portion having a compression system for densifying the press charges in said infeed portion, the compression system including a roller unit having plural rollers arranged to form an inclined plane, and inclined platen tracks associated with each press platen and in contact with said rollers through said infeed portion, to move each said upper and lower press platen toward a corresponding upper or lower press platen thereby densifying the press charges disposed therebetween, wherein said inclined platen tracks are fixed to said platens to travel therewith wherein a first set of plural rollers is disposed in a compression path, and a second set of plural rollers is disposed in a clamping path, and each of said inclined platen tracks includes a compression portion aligned with said first set of rollers in said compression path, and a roll-off portion aligned with said second set of rollers in said clamping path.

3. A continuous press for pressing laterally extending glued press charges, comprising:

a plurality of upper and lower press platens;

an upper power-driven press platen conveyor, disposed above the press charges, for mounting and driving said upper press platens through a working stretch of the press:

a lower power-driven press platen conveyor, disposed below the press charges, for mounting and driving said lower press platens through said working stretch;

fixing means traveling with said platens for selectively fixing the relative position of said upper and lower platens, such that a predetermined amount of pressure is applied to the press charges as they are conveyed through the working stretch, at least a portion of said fixing means directly interconnecting upper and lower press platens; and wherein said fixing means comprises a plurality of clamps which each engage and travel through said working stretch with a set of press platens comprised of at least one upper press platen and at least one lower press platen;

further comprising an infeed portion having an infeed compression system for compressing the press charges in said infeed section, wherein said infeed compression system comprises:

a roller unit having plural rollers, including a first set of rollers arranged in a compression path and a second set of rollers in a disposition parallel to that of said first set of rollers, said roller unit being arranged to form an inclined plane in said infeed portion; and inclined platen tracks associated with each press platen, each including a compression portion which is aligned with said first set of rollers to gradually move said upper and lower press platens toward each other, and a roll-off portion which is aligned with said second set of rollers to impart additional compression of the upper and lower press platens toward each other prior to clamp engagement.

4. The combination of claim 3 wherein said platens include an inner surface for contacting said workpiece and an outer surface, and wherein said inclined platen tracks are carried on said outer surfaces.

5. A continuous press for pressing a laterally extending glued press charge, comprising:

an infeed portion;

a working stretch;

an outfeed portion;

a pair of power-driven cooperating press belts for mounting a plurality of press platens above and below the press charge; and a clamp assembly which includes selectively engagable, movable clamps disposed for traveling with and fixedly clamping opposed press platens to apply pressure to the press charge during travel through the working stretch, and a mechanism for selectively engaging said clamps at least a portion of said clamp pressing directly engaging press platens above and below the press charge;

further comprising a first compression system for biasing the press platens toward one another prior to engagement of said clamps, and a second compression system for biasing the press platens toward one another prior to disengagement of said clamps;

further comprising a first compression system for biasing the press platens toward one another prior to engagement of said clamps, and a second compression system for biasing the press platens toward one another prior to disengagement of said clamps; and wherein said infeed portion includes said first compression system for compressing a press charge along the length of said infeed portion, including a roller unit having plural rollers arranged to form an inclined plane, and inclined platen tracks associated with each press platen to convey press platens located above the press charge toward press platens located below the press charge and wherein said roller unit includes a first set of rollers arranged in a compression path, forming an inclined path in said infeed portion, and a second set of rollers arranged adjacent a clamping station, and wherein said inclined platen tracks each includes a compression portion which is aligned throughout said infeed portion with said first set of rollers and a roll-off portion which is aligned with said second set of rollers.

6. A continuous press for pressing laterally extending glued press charges, comprising:

a plurality of upper and lower press platens;

an upper power-driven press platen conveyor, disposed above the press, charges, for mounting and driving said upper press platens through a working stretch of the press;

a lower power-driven press platen conveyor disposed below the press charges, for mounting and driving said lower press platens through said working stretch;

a non-resilient, positive clamp system traveling with said platens designed to selectively fix the relative position of said upper and lower platens, at least a portion of said clamp system directly interconnecting upper and lower press platens; and an engagement and disengagement system for non-rotationally moving said clamp system into and out of engagement with said platens in a direction perpendicular to the direction of motion of said platens through the working stretch;

wherein said clamp system includes a generally C-shaped clamp positioned adjacent each lateral side of each press platen, said lamps each having two inwardly extending legs and the central portion extending therebetween, and each of the press platens including clamp-receiving surfaces adjacent their lateral edges designed to be engaged by said C clamp legs when said clamp system is in the engaged position and wherein said C clamp legs include inclined surfaces, and said clamp-receiving surfaces are inclined in a complementing fashion, so that by moving said C-clamp further toward said press platens to more fully engage said complementing inclined surfaces, the spacing between said press platens will be reduced.

* * * * *